(12) United States Patent
Ishii

(10) Patent No.: US 8,511,913 B2
(45) Date of Patent: Aug. 20, 2013

(54) OPTICAL TRANSCEIVER

(75) Inventor: Satoru Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 31 days.

(21) Appl. No.: 13/356,105

(22) Filed: Jan. 23, 2012

(65) Prior Publication Data
US 2012/0195558 A1 Aug. 2, 2012

(30) Foreign Application Priority Data
Jan. 28, 2011 (JP) .................................. 2011-017229

(51) Int. Cl.
G02B 6/255 (2006.01)
G02B 6/00 (2006.01)
G02B 6/36 (2006.01)
G02B 6/42 (2006.01)

(52) U.S. Cl.
USPC ............................................. 385/92; 385/89

(58) Field of Classification Search
USPC .................... 385/88–98, 147, 52, 76
See application file for complete search history.

(56) References Cited

U.S. PATENT DOCUMENTS

| | | | | |
|---|---|---|---|---|
| 6,840,686 B2 * | 1/2005 | Jiang et al. | ........................ | 385/92 |
| 6,901,221 B1 * | 5/2005 | Jiang et al. | ..................... | 398/138 |
| 6,952,532 B2 * | 10/2005 | Dair et al. | ..................... | 398/139 |
| 7,116,912 B2 * | 10/2006 | Pang et al. | ..................... | 398/139 |
| 7,347,634 B2 * | 3/2008 | Gunther et al. | ................. | 385/92 |
| 7,435,105 B2 * | 10/2008 | Rosenberg | ................... | 439/76.1 |
| 7,594,766 B1 * | 9/2009 | Sasser et al. | .................... | 385/89 |
| 2003/0020986 A1 * | 1/2003 | Pang et al. | ...................... | 359/152 |
| 2005/0232555 A1 * | 10/2005 | Rosenberg | ....................... | 385/88 |
| 2005/0265650 A1 * | 12/2005 | Priyadarshi et al. | ............ | 385/14 |

FOREIGN PATENT DOCUMENTS

| JP | 8-43691 A | 2/1996 |
|---|---|---|
| JP | 2010511907 A | 4/2010 |

* cited by examiner

*Primary Examiner* — Akm Enayet Ullah

(57) ABSTRACT

Provided is an optical transceiver with which at least a pair of printed boards disposed in parallel having respective electric connector sections and at least a pair of transmission and reception optical modules can be easily housed inside a casing whose size is standardized, and the size thereof can be reduced. The optical transceiver is formed by including: a casing; a transmission rigid board and a reception rigid board provided in parallel with a space provided therebetween inside the casing; optical modules for converting an electric signal and an optical signal, respectively, by being connected at outside positions of each of the rigid boards inside the casing via flexible boards and a module mounting board; an optical connector mounted at an end of the casing; and optical fiber arrays which connect the optical modules to the optical connector.

9 Claims, 10 Drawing Sheets

OPTICAL TRANSCEIVER

CROSS-REFERENCE TO RELATED APPLICATION

This application is based upon and claims the benefit of priority from Japanese patent application No. 2011-017229, filed on Jan. 28, 2011, the disclosure of which is incorporated herein in its entirety by reference.

BACKGROUND OF THE INVENTION

1. Field of the Invention

The present invention relates to an optical transceiver. More specifically, the present invention relates to an optical transceiver which easily houses a plurality of transmission/reception printed boards and transmission/reception optical modules inside a casing whose size is standardized.

2. Description of the Related Art

An optical transceiver including a light emitting module (for transmission) and a light receiving module (for reception) for mutually converting electric signals and optical signal is known.

Regarding the optical transceiver, an optical input/output interface which conducts processor data transmission and reception is known (see Japanese Unexamined Patent Publication Hei 08-043691 (Patent Document 1), for example).

The optical input/output interface disclosed in Patent Document 1 is structured to include an optical fiber module and another neighboring optical fiber module, which makes it possible to improve the data transfer throughput and the packaging density.

Further, also known is an optical transceiver which converts optical signals of a plurality of channels from a first side into electric signals and outputs those to a second side, and converts electric signals of a plurality of channels from the second side to optical signals and outputs those to the first side (see Japanese Patent Application Publication 2010-511907 (Patent Document 2), for example).

The optical input/output interface disclosed in Patent Document 2 is proposed in order to prevent the optical interference and the electric interference between the channels.

Further, an optical transceiver developed to achieve an object different from those of Patent Document 1 and Patent Document 2 described above is known as well.

That is, as a general rule, a transmission optical port and a reception optical port for a signal to be transmitted is of 1 channel in the optical transceiver. However, recently, there has been devised an optical transceiver which includes a plurality of transmission optical ports as well as reception optical ports and connects an optical fiber array due to an increase in the communication bit rate. Accordingly, there have been achieved standardizations of QSFP (Quad Small Form-factor Pluggable; next-generation interface), CXP (120 Gb/s 12× Small Form-factor Pluggable), and the like in Infiniband (next-generation network standards corresponding to servers and inter-storage data transmission).

As described, while the casing size is defined by MSA (Multi Source Agreements; ISO Assessment Organization), with CXP including optical transmission/reception ports of 12 channels, for example, differential electric signals of 24 channels in total for transmission and reception in the small-size casing are to be transmitted inside the casing, and there are a great number of electric connectors for the outside. Thus, regarding a printed board to be a card edge including the connectors, not a single printed board but two printed boards are disposed in parallel. The size and the space to be provided therebetween are also defined by MSA described above.

MSA promotes to define specifications of each of the components in order to satisfy the market demands such as the port density, the power consumption, the performance, and the cost.

Next, the outline of the structure of an optical transceiver 110 including two printed boards 120 as mentioned above will be described by referring to FIG. 7 and FIG. 8.

As shown in FIG. 7 and FIG. 8, the optical transceiver 110 includes: a casing 111; and two printed boards 112, i.e., a transmission printed board 112A and a reception printed board 112B, which are provided inside the casing 111 in parallel with a space therebetween by including electric connector sections 112C, 112C capable of being connected to each other.

At the end of each of the printed boards 112A, 112B on the opposite side of the electric connector sections 112C, 112C, two optical modules 114 which mutually convert the electric signals and the optical signals, i.e., a transmission optical module 114A and a reception optical module 114B, are mounted.

Further, each of the optical modules 114A, 114B is connected to an external output optical connector 117 mounted to the end of the casing on the opposite side of the electric connector sections 112C, 112C of the casing 111 via a pair of optical fiber arrays 116 constituted with a transmission optical fiber array 116A and a reception optical module array 116B. Further, one end of the optical fiber arrays 116 is connected to an optical fiber array-to-optical fiber array connector 119.

FIG. 7 shows a state where a lid (not shown) of the casing 111 is detached, and "upper side" and "lower side" in FIG. 8 show the positional relationship when the optical transceiver 110 is placed in a normal use state.

As shown in FIG. 9, the optical fiber arrays 116 are normally placed in line along the plane direction. Thus, it is difficult to draw them around in the twisting direction, and it is not preferable since the probability of causing deterioration of the property due to damage or nonuniformity in the stress of each fiber is high.

Thus, to mount the optical modules 114A and 114B by tilting them or by changing the facing directions is difficult, since the layout of the optical connector 117 is defined.

Therefore, as shown in FIG. 7, FIG. 9, and FIG. 10, it is necessary to place the optical modules 114A and 114B to be in parallel to the layout of each of the ports 120 of the optical connector 117. In that case, it is the simplest way to employ a structure in which those are directly mounted on the top faces of each of the printed boards 112A and 112B.

In the meantime, regarding the optical transmission/reception ports, MSA defines the structure of 12×2 as the layout of the ports of 24 channels in total for transmission and reception. However, as shown in details in FIG. 8, the space between the two optical modules, that is, the space (distance D) from the transmission optical module 114A and the reception optical module 114B to the optical output port and the space between the two printed boards 112 located vertically (see FIG. 8) are largely different from each other. Thus, it is necessary to adjust the positions thereof.

However, even though the optical input/output interface disclosed in Patent Document 1 is formed in the structure that can improve the data transfer throughput and the packaging density, the structure corresponding to MSA is not mentioned therein.

Also, even though the optical transceiver disclosed in Patent Document 2 is formed in the structure which prevents the optical interference and the electric interference generated between the neighboring channels, the structure corresponding especially to the height defined by MSA is not mentioned in the disclosure regarding the optical transceiver.

Furthermore, there are following issues with the optical transceiver 110 shown in FIG. 7 and FIG. 8.

That is, in the optical transceiver 110, the transmission and reception optical modules 114A and 114B are mounted on each of the printed boards 112A and 112B. However, the height A inside the casing 111 and the distance B between the two printed boards 112A and 112B are defined by MSA, so that it is difficult to mount the transmission optical module 114A and the reception optical module 114B directly on the printed boards 112A and 112B depending on the height C of each of the optical modules 114A and 114B because of the restriction of the size.

Further, regarding the optical fiber arrays 116 to be the paths from each of the optical modules 114A and 114B to the optical connector 117 of the casing 111, it is necessary to have the distance D sufficient for the distance B between the boards because of the restriction of the minimum radius curvature r. As a result, there faces an issue in terms of reducing the size of the optical transceiver 110.

Further, the two printed boards 112A and 112B directly receive the oscillation from the outside and the impact generated by attaching detaching the external connector of the optical transceiver 110, which may result in damaging the optical fiber arrays 116 due to the oscillation and impact and may result in the optical axis shift generated in the junction parts between each of the optical modules 114A, 114B and the optical fiber arrays 116.

In order to overcome each of the aforementioned issues, it is therefore an exemplary object of the present invention to provide an optical transceiver with which at least a pair of printed boards disposed in parallel having respective electric connector sections and at least a pair of transmission and reception optical modules can be easily housed inside a casing whose size is standardized, and the size thereof can be reduced.

SUMMARY OF THE INVENTION

In order to achieve the foregoing object, the optical transceiver according to an exemplary aspect of the invention is characterized as an optical transceiver which includes: a casing; at least a pair of transmission and reception printed boards provided inside the casing in parallel to each other with a prescribed space provided therebetween, each having an electric connector section provided at one end, which is capable of being connected to the other board of each other; a pair of optical modules for the respective printed boards provided, respectively, to other end sides of the pair of printed boards inside the casing for mutually converting an electric signal and an optical signal; an optical connector provided on an optical output side in a region of the other ends of the pair of printed boards; and at least a pair of optical fiber arrays which connect the pair of optical modules and the optical connector, wherein the pair of optical modules are disposed between the optical connector and the pair of printed boards via a connecting member, and a length between module mounting faces of the connecting member where the pair of optical modules are mounted is set to be smaller than a length between the pair of printed boards.

DETAILED DESCRIPTION OF THE PREFERRED EMBODIMENTS

Hereinafter, a first exemplary embodiment of an optical transceiver according to the present invention will be described by referring to FIG. 1 and FIG. 2.

Figure 1:
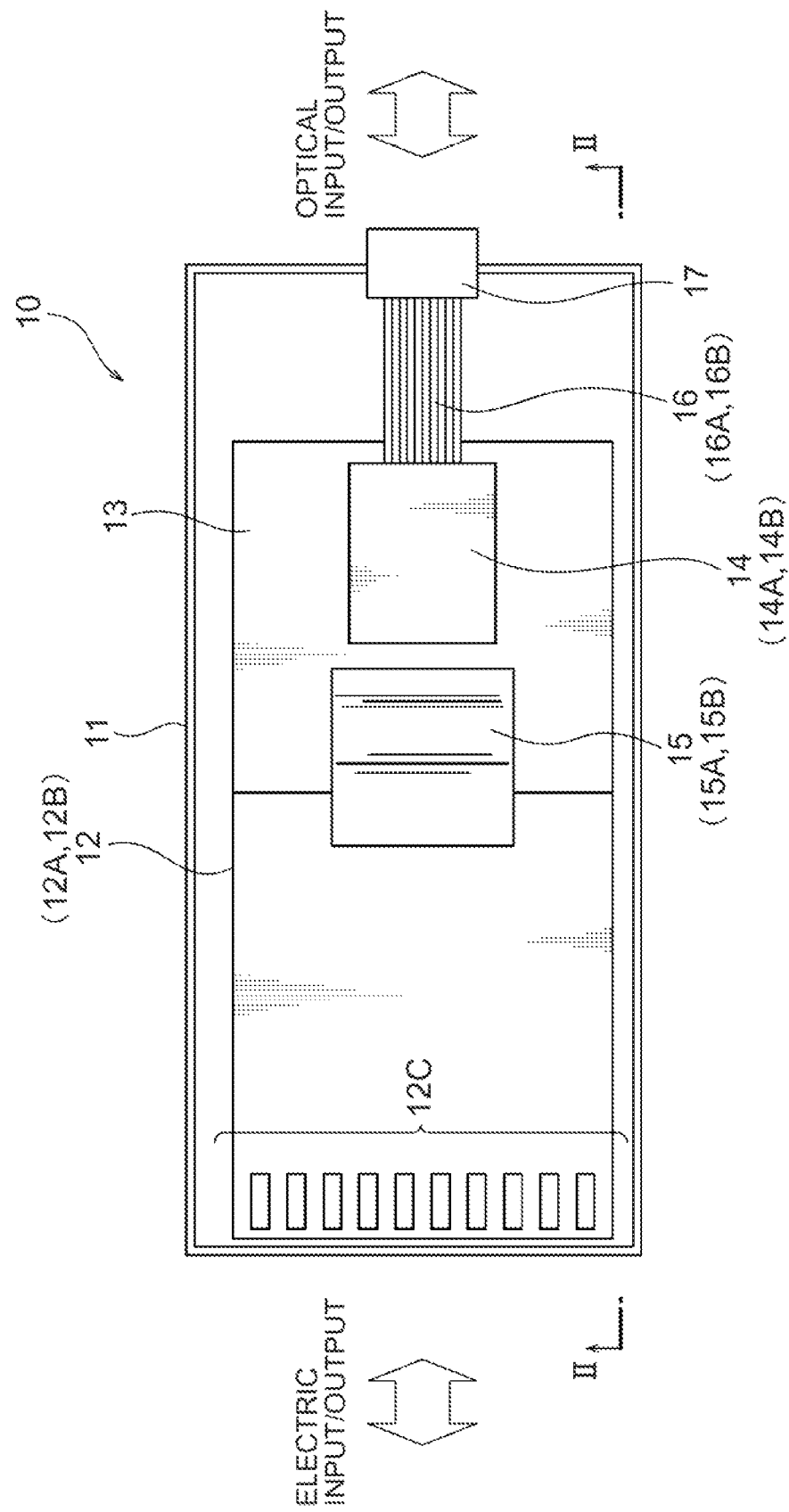
FIG. 1 shows a first exemplary embodiment of an optical transceiver according to the present invention, which is an overall top face schematic view of a state where a lid of a casing is detached.
Figure 2:
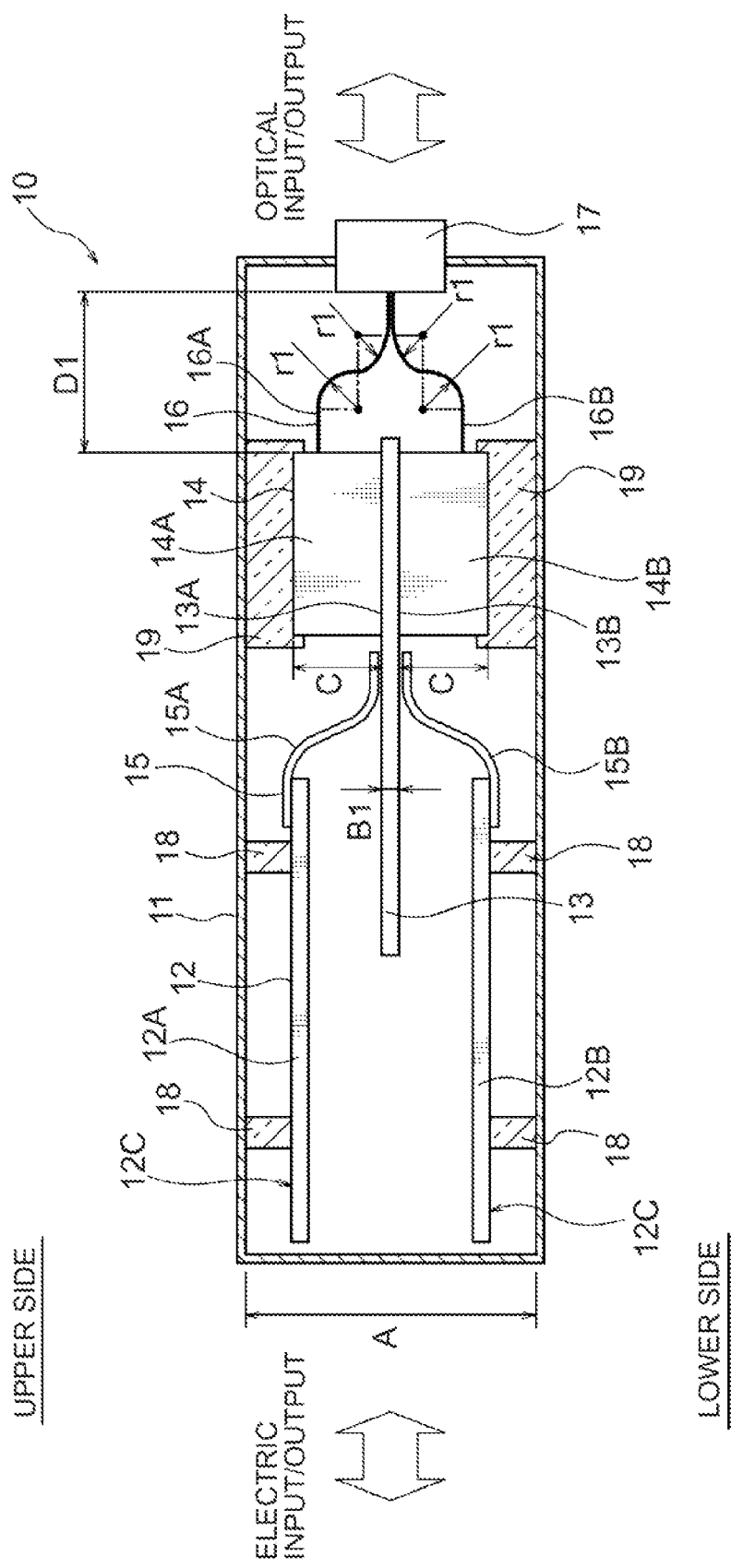
FIG. 2 is a longitudinal sectional view taken along a line II-II of FIG. 1.

As shown in FIG. 1 and FIG. 2, the optical transceiver 10 according to the exemplary embodiment is for performing optical communications mutually by being placed between a server and a data device, for example.

The optical transceiver 10 is structured by including: a substantially cuboid casing 11; a transmission rigid board 12A and a reception rigid board 12B constituting at least a pair of printed boards 12, each being provided inside the casing 11 and disposed in parallel in the vertical direction; a single module mounting board 13 whose one end is located substantially in the center of the vertical direction of the both boards 12A, 12B and the other end is extended in the direction away from the both boards 12A, 12B; a transmission optical module 14A mounted on the top face of the module mounting board 13 and a reception optical module 14B mounted on the back face of the module mounting board 13 constituting at least a pair of optical modules 14; and a transmission flexible board 15A for connecting the transmission rigid board 12A and the module mounting board 13 and a reception flexible board 15B for connecting the reception rigid board 12B and the module mounting board 13 constituting at least a pair of flexible boards 15.

The module mounting board 13 is formed by a rigid board.

All of the transmission rigid board 12A, the reception rigid board 12B, and the module mounting board 13 are rigid boards. However, as shown in FIG. 1 and FIG. 2, in a case where the rigid boards exist at two places, i.e., on the electric connector section 12C side and the side where the transmission optical modules 14A, 14B are loaded, by having a pair of flexible boards 15 formed as the boundary, the rigid boards on the electric connector section 12C side, i.e., the transmission rigid boards 12A and 12B, are often called as card edge boards for the convenience' sake.

Further, FIG. 1 shows a state where the lid (not shown) of the casing 11 is detached, and "upper side" and "lower side" in FIG. 2 show the positional relationship when the optical transceiver 10 is placed in a normal use state.

An optical connector 17 is provided at the one end side of the casing 11 substantially in the center part of the height direction and the width direction.

The optical connector 17 is an important interface component for securing the reliability and flexibility of an optical communication network. Further, a transmission optical fiber array 16A connected to an optical output section of the transmission optical module 14A and a reception optical fiber array 16B connected to an optical input section of the reception optical module 14B, which constitute a pair of optical fiber arrays 16, are coupled to the optical connector 17, respectively.

Each of the optical fiber arrays 16A and 16B is in a shape having a bent part being bent by a radius curvature r1 from the opposite directions from each other.

The electric connector section 12C is provided, respectively, to the ends of each of the rigid boards 12A and 12B on the opposite side of the optical connector 17. Through the electric connector section 12C, each of the rigid boards 12A and 12B can be freely connected and disconnected with the devices and the like of each other.

As shown in FIG. 2, the transmission flexible board 15A is provided by being bent from the top face of the transmission rigid board 12A towards the top face of the module mounting board 13, i.e., towards the lower direction, in the opposite direction from each other.

Further, one end of the flexible board 15A is connected to the other end of the transmission rigid board 12A, and the other end of the flexible board 15A is connected to a part of the module mounting board 13.

Further, the transmission flexible board 15B is provided by being bent from the top face of the reception rigid board 12B towards the back face of the module mounting board 13, i.e., towards the upper direction, in the opposite direction from each other. One end of the flexible board 15B is connected to the other end of the reception rigid board 12B, and the other end of the flexible board 15B is connected to a part of the module mounting board 13.

As described above, the transmission flexible board 15A and the reception flexible board 15B are disposed symmetrically in the vertical direction by sandwiching the module mounting board 13 therebetween.

As described above, the transmission optical fiber array 16A and the reception optical fiber array 16B are provided in a connected form by being bent with the radius curvature r1 from the opposite direction from each other towards the optical connector 17 from the optical output section of the transmission optical module 14A and the optical input section of the reception optical module 14B.

As described above, the transmission optical module 14A is mounted to the top face of the module mounting board 13, and the reception optical module 14B is mounted to the back face of the module mounting board 13. That is, the top face of the module mounting board 13 constitutes a module loading face 13A, while the back face of the module mounting board 13 constitutes a module loading face 13B, respectively.

Due to such structure, the distance B1 between the opposing faces of the both optical modules 14A and 14B is reduced to the thickness of the module mounting board 13. Thus, even when the height C of the both optical modules 14A and 14B is set to the defined length, the optical modules 14A and 14B can be housed with a margin without increasing the size of the casing 11. That is, the restriction set due to the height C of the optical modules 14A and 14B can be overcome.

The transmission optical module 14A converts an electric signal travelled via the transmission rigid board 12A and the transmission flexible board 15A into an optical signal, and outputs the converted optical signal to the outside via the transmission optical fiber array 16A and the optical connector 17.

In the meantime, the reception optical module 14B converts an optical signal travelled via the optical connector 17 and the optical fiber array 16B into an electric signal, and outputs the converted electric signal from the electric connector section 12C via the connector of the device on the other side.

As described above, the transmission optical module 14A and the reception optical module 14B are mounted to the top and back faces of the module mounting board 13 and are close to each other in the vertical direction, so that the distance between the output port of the optical module 14A and the input port of the optical module 14B becomes short. Thus, the radius curvature r1 of the bent parts of the transmission optical fiber array 16A and the reception optical fiber array 16A can be made small. As a result, the distance D1 from each of the optical modules 14A, 14B to the optical connector 17 can be shortened. Therefore, it is possible to reduce the size of the casing 11, thereby making it possible to reduce the size of the optical transceiver 10.

Note here that the widths of each of the rigid boards 12A, 12B and the module mounting board 13 are formed to be substantially in the same length. Further, each of the flexible boards 15A, 15B is formed to be in a width smaller than the widths of the module mounting board 13 and the like, and is disposed substantially at the center part of the width direction of each of the rigid boards 12A, 12B and the module mounting board 13.

Further, the widths of the optical fiber arrays 16A and 16B are formed to be smaller than the widths of each of the optical modules 14A, 14B and the optical connector 17.

Further, as shown in FIG. 2, each of the rigid boards 12A and 12B is held to the casing 11 by an insulating-type board holding member 18 and the like, while each of the optical modules 14A, 14B is held to the casing 11 by an insulating-type board holding member 19 and the like.

With the optical transceiver 10 according to the first exemplary embodiment in the structure described above, following effects can be achieved.

(1) The transmission and reception rigid boards 12A, 12B and the optical module mounting board 13 are connected by the transmission flexible board 15A and the reception flexible board 15B, respectively, and the optical module mounting board 13 is disposed at substantially the intermediate position of the length between the rigid boards 12A, 12B. Thus, the space between the mounting positions of, the transmission optical module 14A and the reception optical module 14B can be shortened to the thickness of the module mounting board 13. As a result, the optical modules 14A and 14B can be housed with a margin, and the restriction set due to the height C of the optical modules 14A and 14B can be overcome. Further, this makes it possible to suit the standards of MSA.

(2) Since the transmission-side output port of the transmission optical module 14A and the input port of the reception optical module 14B become closer in the vertical direction, the radius curvature r1 of the bend parts of the transmission optical fiber array 16A and the reception optical fiber array 16B can be made smaller. As a result, the distance D1 from the optical modules 14A, 14B to the optical connector 17 can be made shorter. Therefore, the casing 11 can be formed in a compact size.

(3) The transmission rigid board 12A and the reception rigid board 12B are connected to the optical module mounting board 13, respectively, via the transmission flexible board 15A and the reception flexible board 15B, so that the oscillation/impact imposed upon each of the rigid boards 12A and 12B from outside can be absorbed by each of the flexible boards 15A and 15B. This provides the resistance for the oscillation imposed upon the casing 11 and the impact caused due to attaching/detaching the electric connector section 12C.

(4) The transmission optical modules 14A, 14B are mounted to the transmission/reception flexible boards 15A, 15B, and the flexible boards 15A, 15B are provided within the length of the space between the transmission/reception rigid boards 12A, 12B. Thus, the modules can be easily housed inside the standardized casing with a simple structure. As a result, it becomes unnecessary to use any special exclusively-used mechanisms and components, so that the cost can be lowered.

(5) Since each of the rigid boards 12A, 12B is placed together on a single module mounting board 13, those can be controlled by a single control system. Further, it becomes possible to draw around control signals and monitor signals between the transmission and reception sides and electric connector sections 12C of both sides and to achieve standardization of GND (Ground). This makes it possible to have advantages in terms of wiring and in terms of mounting the control IC.

As an exemplary advantage of the optical transceiver according to the present invention, the length between the module mounting faces of the connecting members where each of the optical modules are mounted is set to be smaller than the length between a pair of printed boards. Therefore, it is possible to provide the optical transceiver with which at least a pair of printed boards disposed in parallel having respective electric connector sections and at least a pair of transmission and reception optical modules can be easily housed inside a casing whose size is standardized, and the size thereof can be reduced.

Next, a second exemplary embodiment of the optical transceiver according to the present invention will be described by referring to FIG. 3 and FIG. 4.

Same reference numerals as those of the first exemplary embodiment are applied to the same members, same structures, and the like in FIG. 3 and FIG. 4 which show the second exemplary embodiment, and only different aspects will be described in details.

Figure 3:
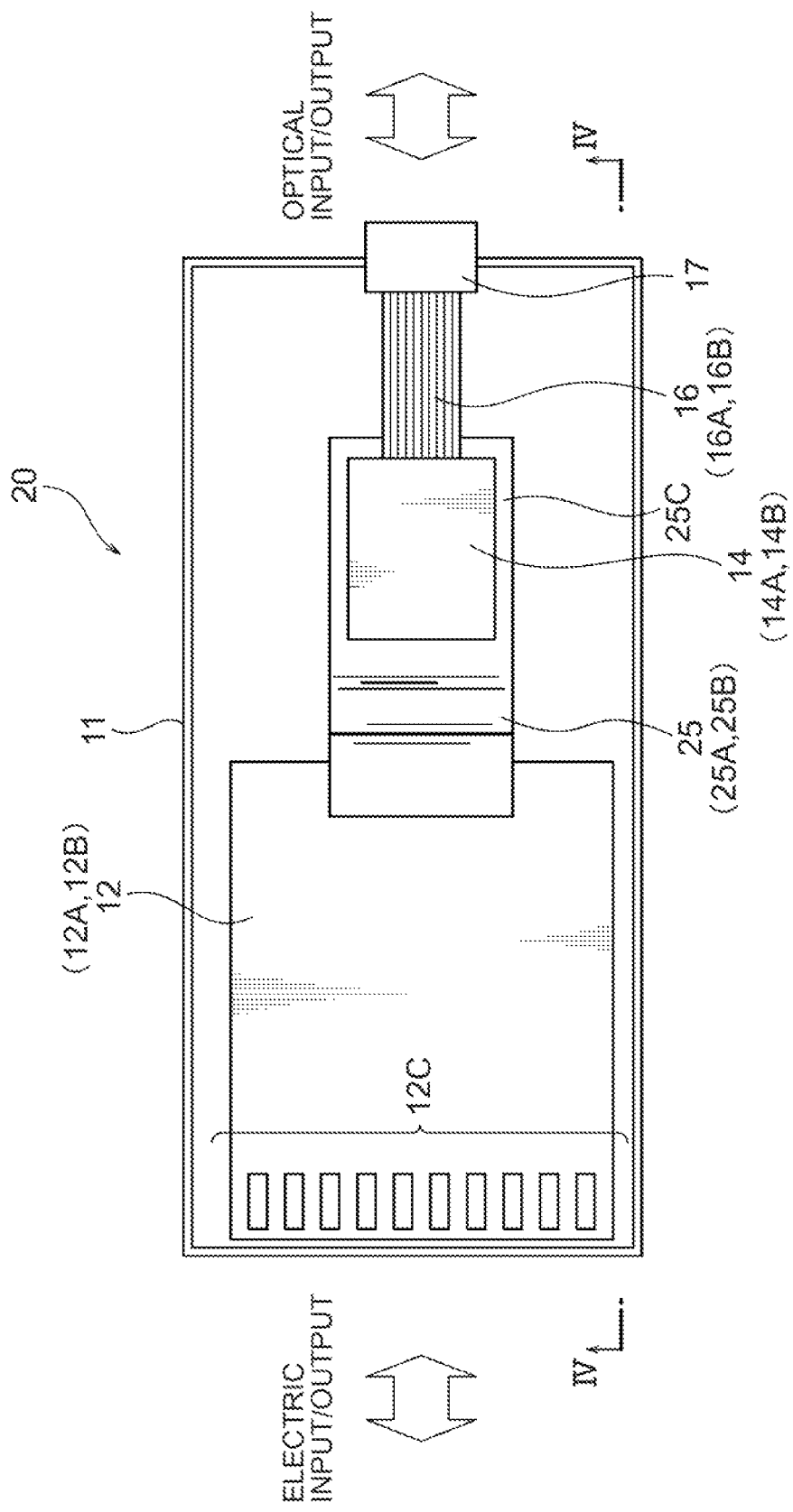
FIG. 3 shows a second exemplary embodiment of the optical transceiver according to the present invention, which is an overall top face schematic view of a state where a lid of a casing is detached.
Figure 4:
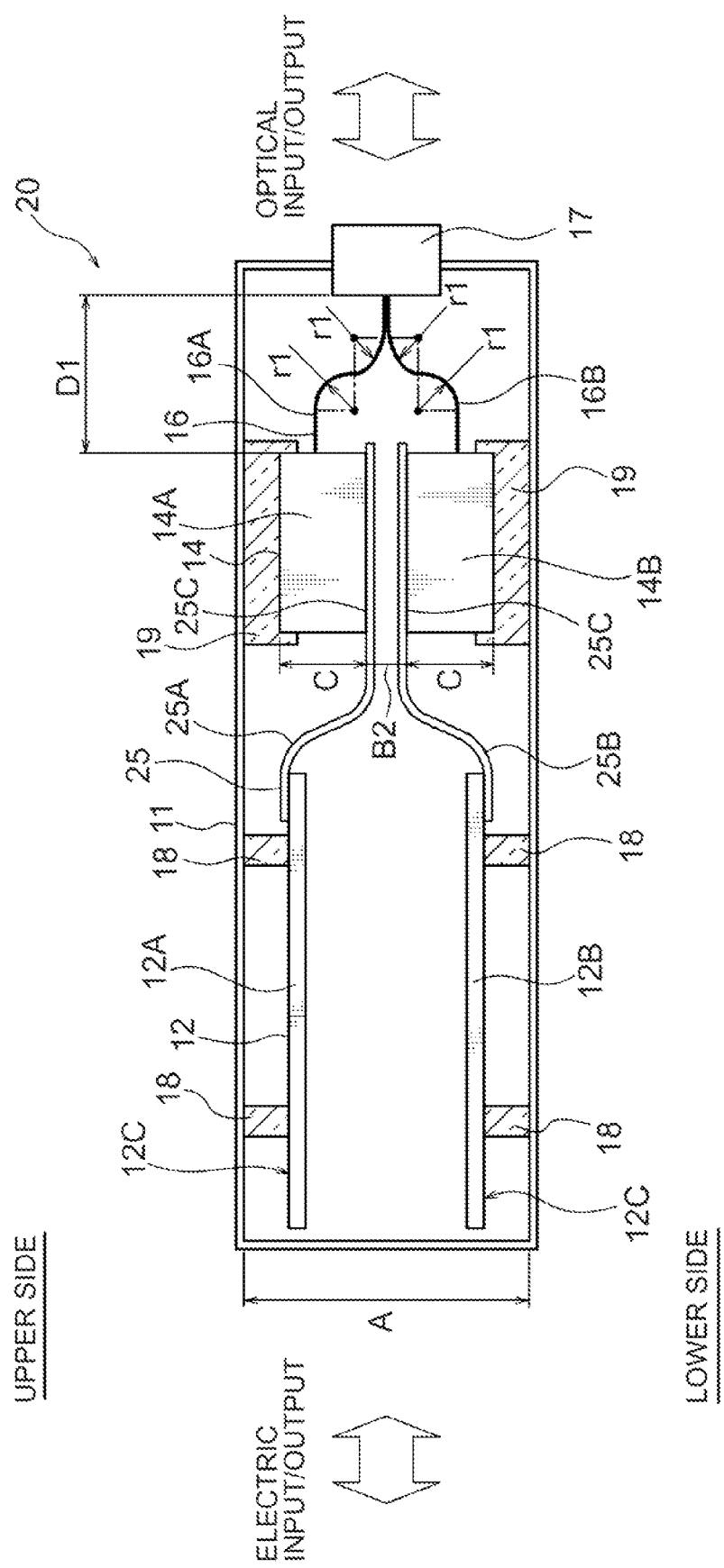
FIG. 4 is a longitudinal sectional view taken along a line IV-IV of FIG. 3.

Further, "upper side" and "lower side" in FIG. 3 show the positional relationship when the optical transceiver 20 is placed in a normal use state.

The optical transceiver 20 according to the second exemplary embodiment does not use the module mounting board 13 of the optical transceiver 10 according to the first exemplary embodiment, and the transmission optical module 14A and the reception optical module 14B are directly mounted, respectively, to a transmission flexible board 25A and a reception flexible board 25B constituting a pair of flexible boards 25.

That is, in the optical transceiver 20 of the second exemplary embodiment, other ends of the transmission flexible board 25A and the reception flexible board 25B are extended to the optical connector 17 side, respectively, and the optical modules 14A, 14B are mounted to the extended other ends 25C, 25C.

The tip-end positions of the other ends of each of the flexible boards 25A and 25B are formed in the length that is to the positions substantially same as the tip-end position of the module mounting board 13.

Further, the other ends 25C, 25C are formed on a flat face part, and formed to be in parallel to the transmission rigid board 12A and the reception rigid board 12B. The other ends 25C, 25C formed on the flat face part constitute the module mounting faces.

Note here that the distance between the flat face parts 25C, 25C of each of the flexible boards 25A, 25B is defined as B2.

Further, as shown in FIG. 3, the widths of each of the flexible boards 25A, 25B are formed to be smaller than the widths of the transmission/reception rigid boards 12A, 12B, and formed to be slightly larger than the widths of each of the optical modules 14A, 14B.

With the optical transceiver 20 of the second exemplary embodiment in the structure described above, not only the effects substantially same as those described in (1) to (4) but also following effects can be achieved.

(6) Since the other ends of the transmission flexible board 25A and the reception flexible board 25B are extended to the optical connector 17 side, respectively, and the optical modules 14A, 14B are mounted to the extended other ends, it is unnecessary to use the module mounting board 13 that is used in the first exemplary embodiment. As a result, the number of components can be reduced, thereby making it possible to lower the cost.

(7) Through setting the widths of the flexible boards 25A, 25B to be substantially the same as the widths of the optical modules 14A, 14B, the load imposed upon the flexible boards generated due to bending can be lightened.

Next, a third exemplary embodiment of the optical transceiver according to the present invention will be described by referring to FIG. 5 and FIG. 6.

Same reference numerals as those of the first exemplary embodiment are applied to the same members, same structures, and the like in FIG. 5 and FIG. 6 which show the third exemplary embodiment, and only different aspects will be described in details.

Figure 5:
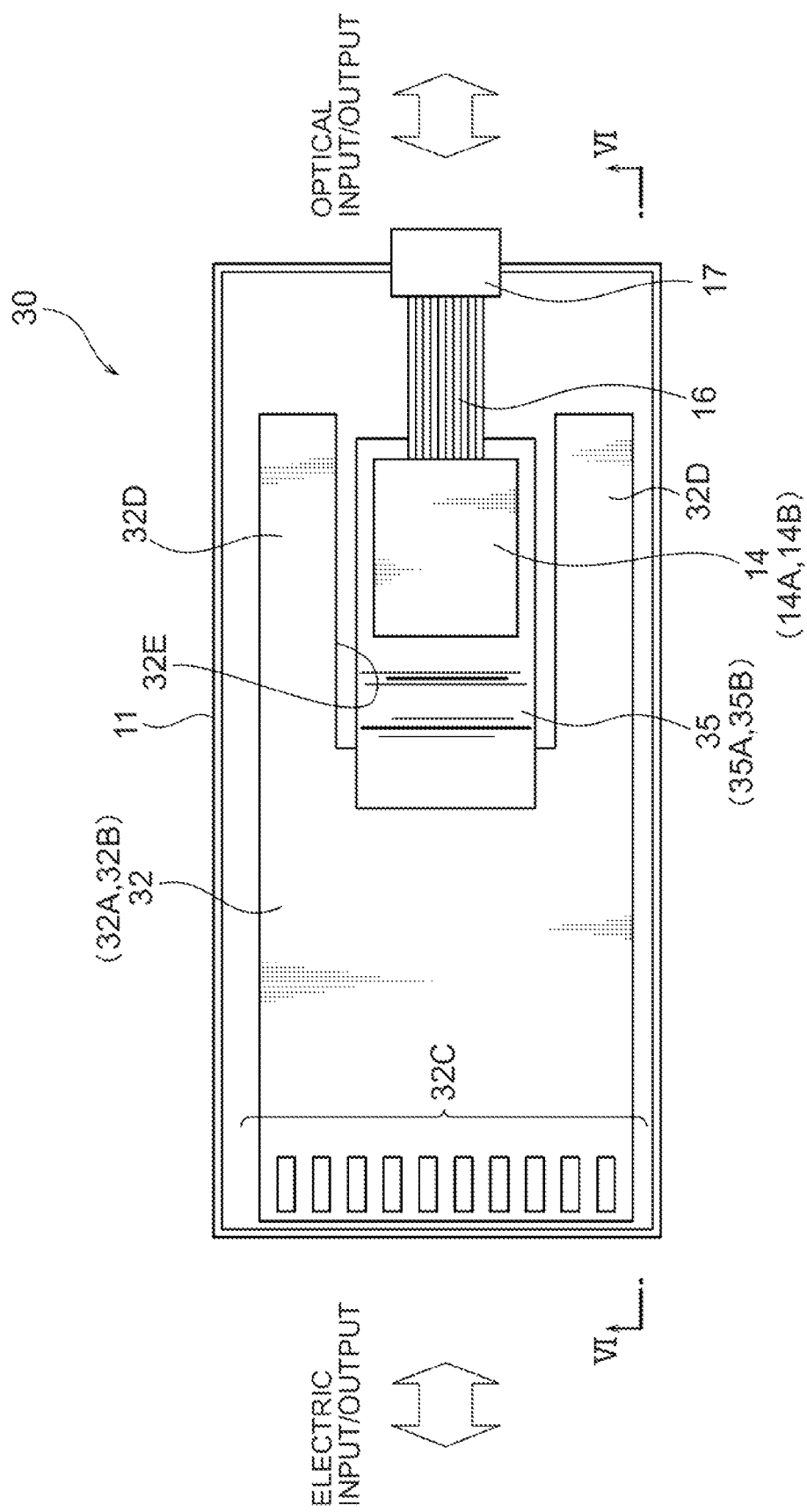
FIG. 5 shows a third exemplary embodiment of the optical transceiver according to the present invention, which is an overall top face schematic view of a state where a lid of a casing is detached.
Figure 6:
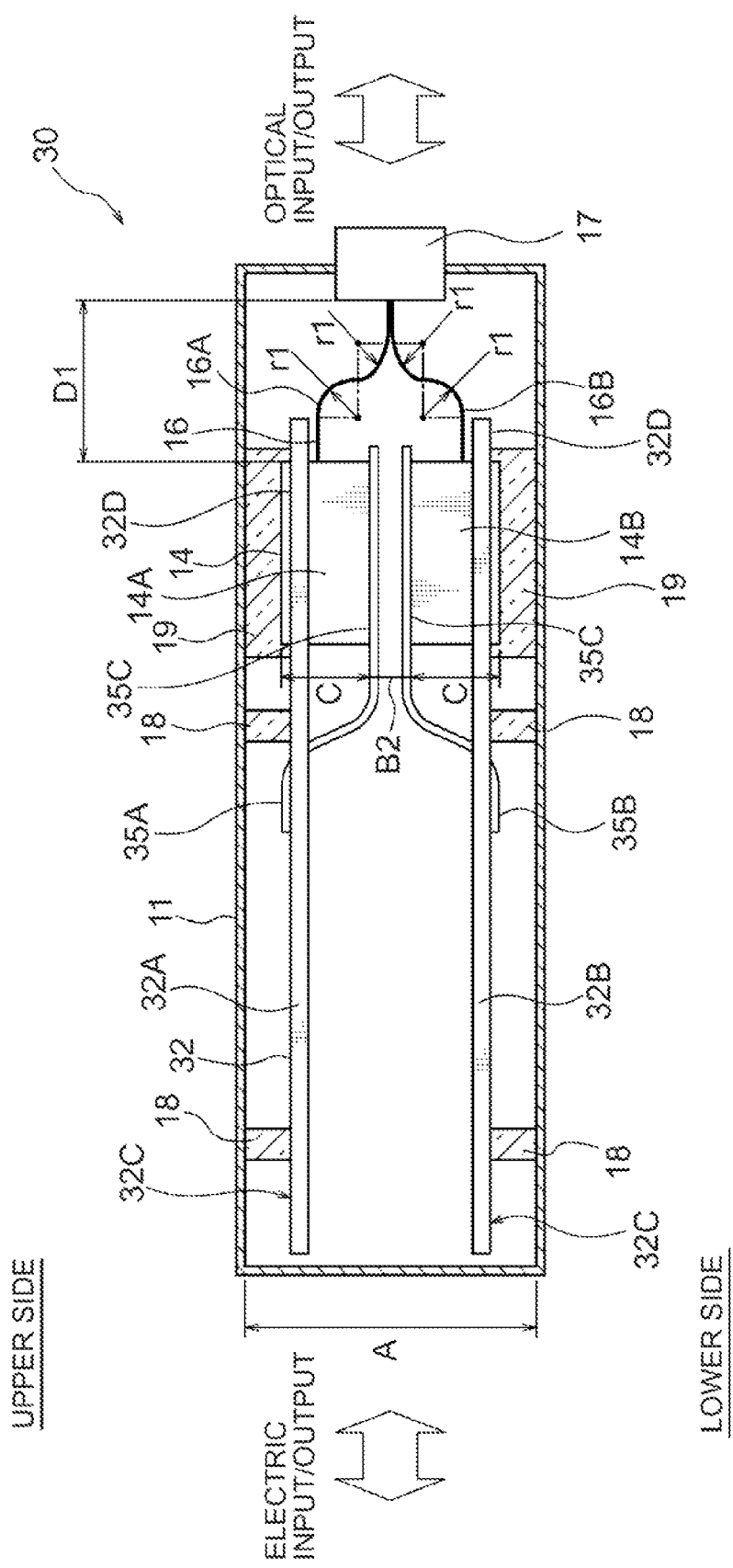
FIG. 6 is a longitudinal sectional view taken along a line VI-VI of FIG. 5.
Figure 7:
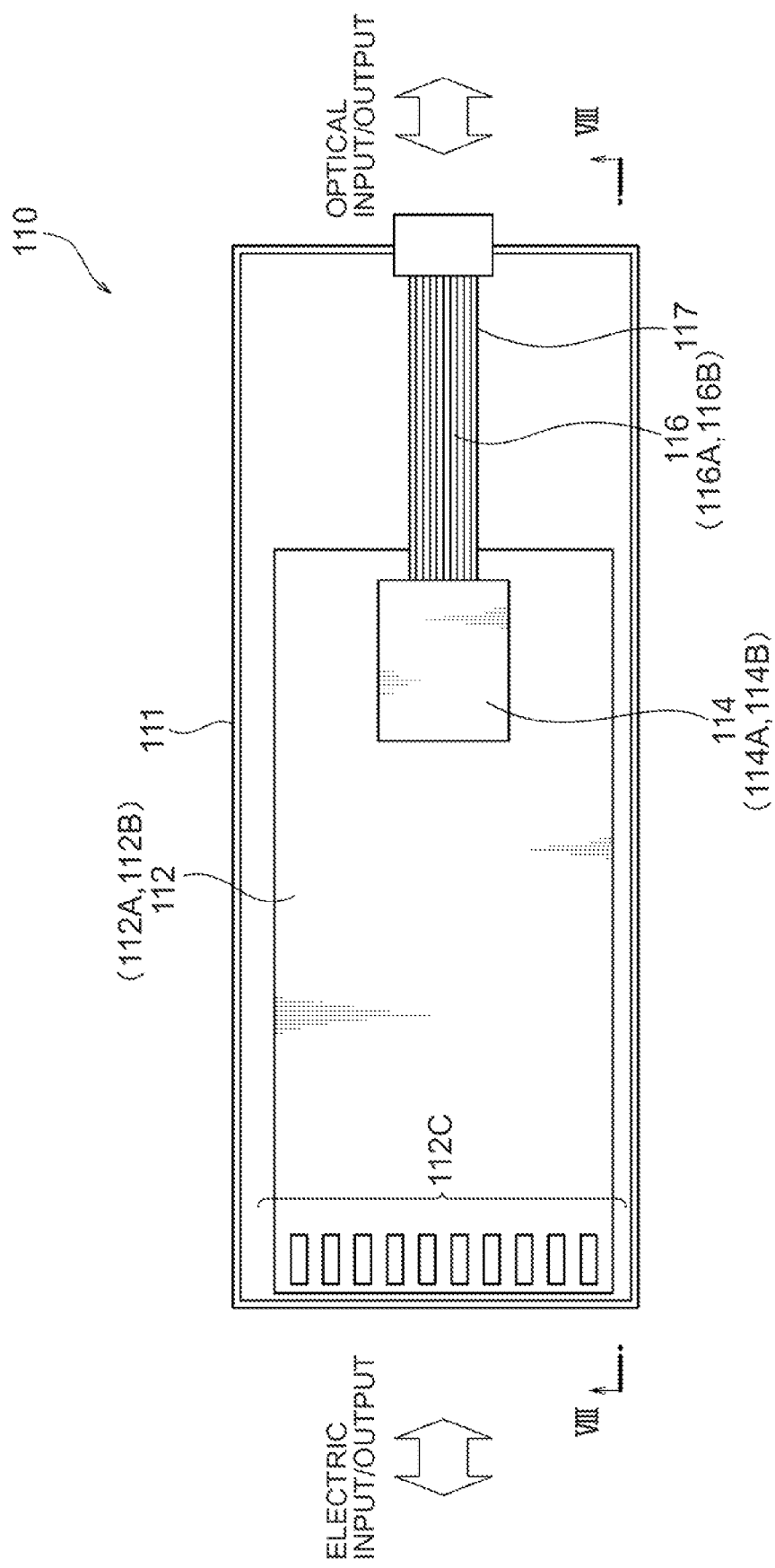
FIG. 7 shows a case of mounting a plurality of standardized transmission/reception printed boards and transmission/reception optical modules mounted in a standardized casing, which is an overall top face schematic view of a state where a lid of a casing is detached.
Figure 8:
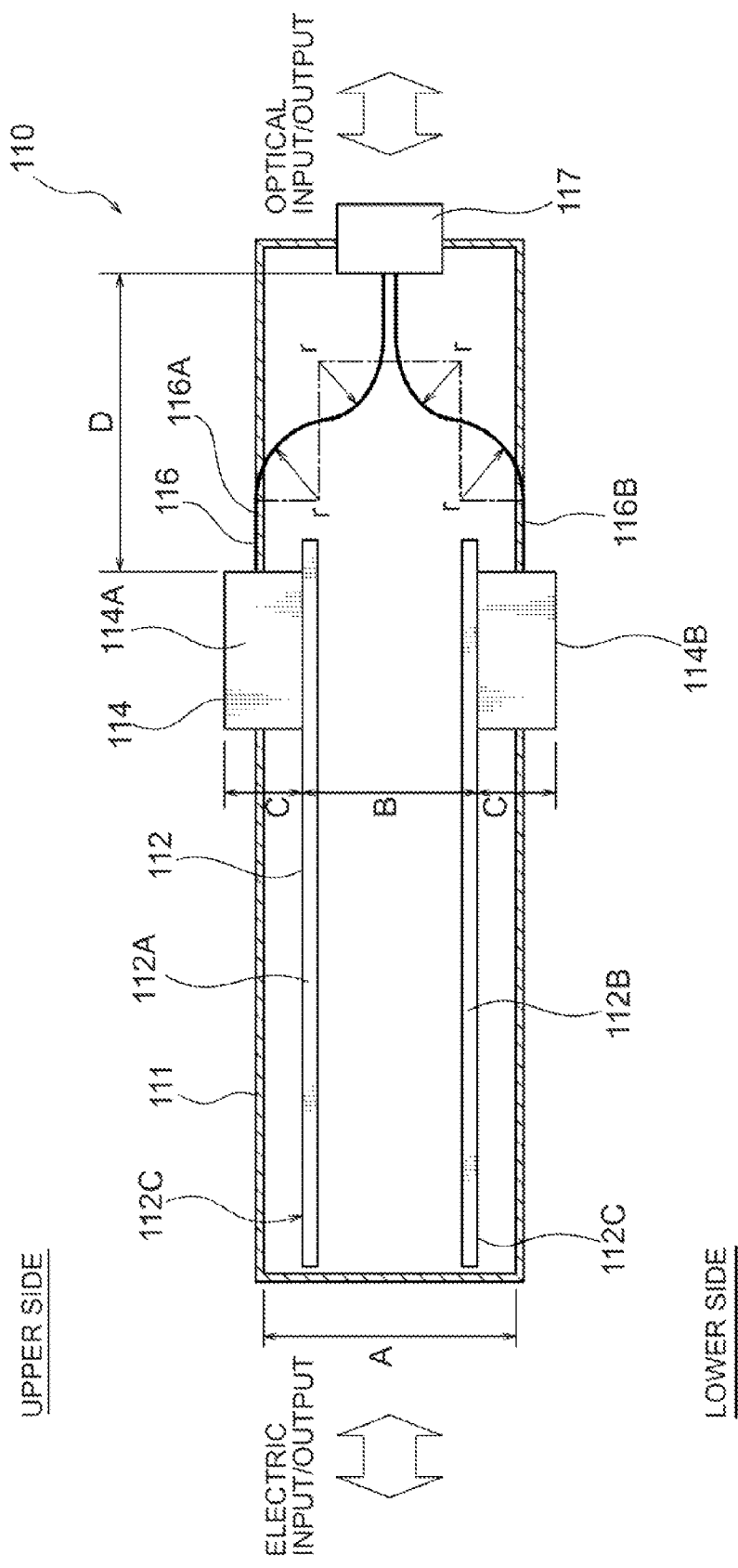
FIG. 8 is a longitudinal sectional view taken along a line VIII-VIII of FIG. 7.
Figure 9:
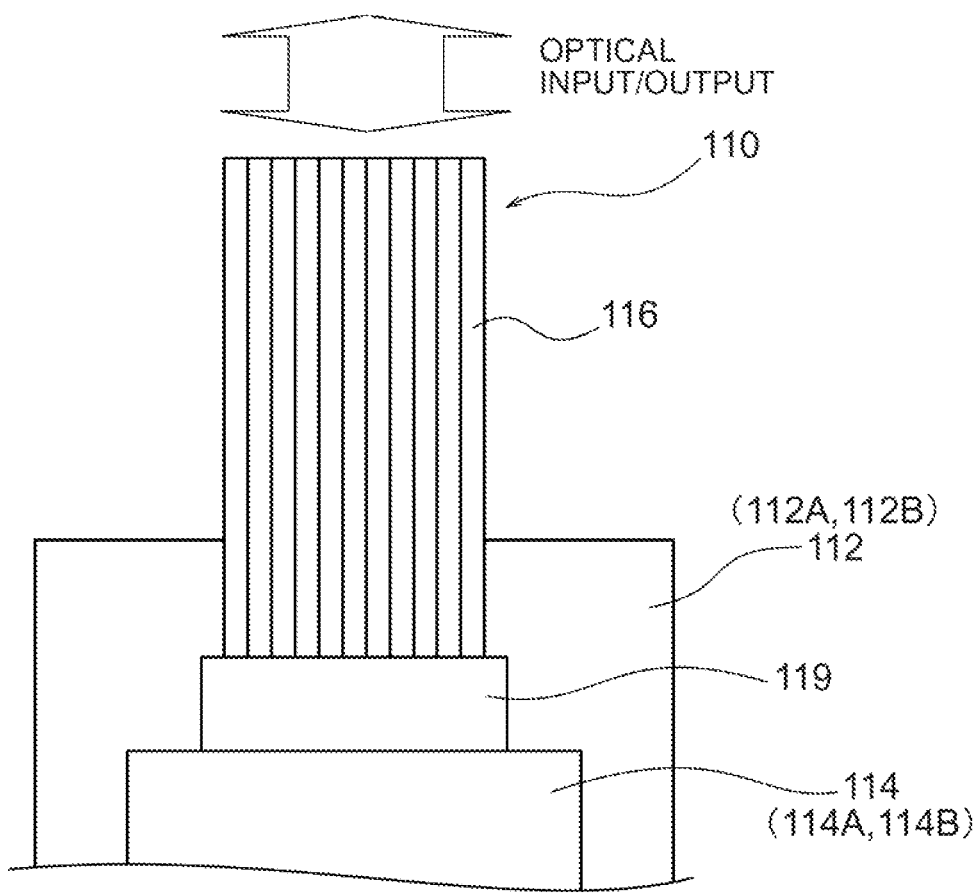
FIG. 9 is an overall side face schematic view of an optical transceiver in a case where transmission and reception optical modules are loaded on two rigid boards.
Figure 10:
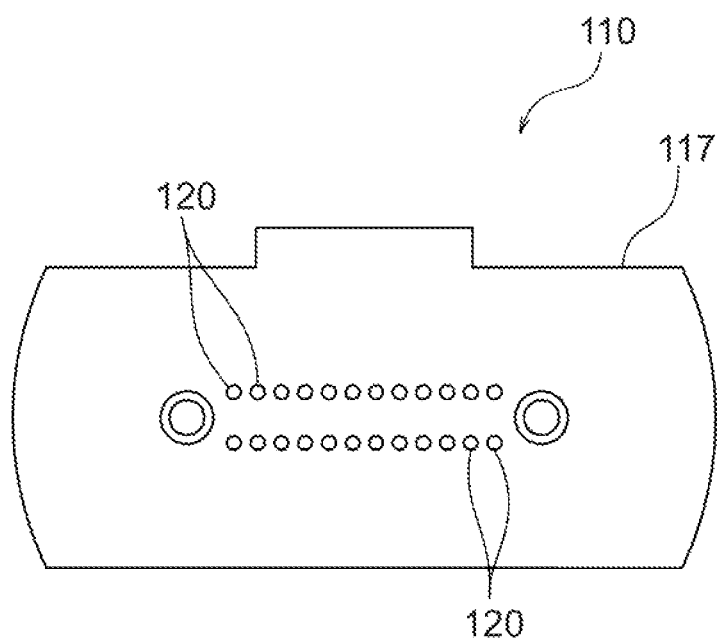
FIG. 10 shows an elevational view of the optical transceiver, which is an X-perspective view of FIG. 9.

Further, "upper side" and "lower side" in FIG. 5 show the positional relationship when the optical transceiver 30 is placed in a normal use state.

In the optical transceiver 30 of the third exemplary embodiment, the widths of a transmission flexible board 35A and a reception flexible board 35B constituting a pair of flexible boards 35 are set to be almost the same as the widths of the transmission optical module 14A and the reception optical module 14B, and other ends of the transmission flexible board 35A and the reception flexible board 35B are extended out towards the optical connector 17 side.

That is, the transmission flexible board 35A and the reception flexible board 35B are formed in the same shapes as those of the flexible boards 25A and 25B of the second exemplary embodiment. In the meantime, extended other ends 32D of a transmission rigid board 32A and a reception rigid board 32B constituting a pair of rigid boards 32 are disposed to sandwich each of the flexible boards 35A and 35B. That is, the flat faces of the other ends of each of the rigid boards 32A, 32B form recessed parts 32E recessed into one end side of the casing 11, and each of the flexible boards 35A, 35B is disposed in the recessed parts 32E.

The surfaces of the flexible boards 35A, 35B in the opposite directions from each other form a module mounting faces 35C on which each of the optical modules 14A, 14B is mounted.

Further, an electric connector section 32C is provided on one ends of each of the rigid boards 32A and 32B.

Note here that the widths of each of the flexible boards 35A and 35B are formed to be slightly larger than the widths of each of the optical modules 14A and 14B.

With the optical transceiver 30 of the third exemplary embodiment in the structure described above, not only the effects substantially same as those described in (1) to (4) as well as (6) and (7) but also following effects can be achieved.

(8) Since the extended other ends 32D extended towards the optical connector 17 side are formed in the transmission rigid board 12A and the reception rigid board 12B, the extended other ends 32D can be used as the IC mounting region and wiring capable region. As a result, designing of still higher versatility can be performed.

While the present invention has been described above by referring to each of the exemplary embodiments, the present invention is not limited only to each of those exemplary embodiments. Various changes and modifications occurred to those skilled in the art can be applied to the structures and details of the present invention. Further, the present invention includes combinations of a part of or a whole part of the structures of each of the above-described embodiments.

For example, while the printed board is constituted with the two rigid boards, i.e., the transmission rigid board 12A and the reception rigid board 12B, in each of the exemplary embodiments described above, the present invention can be applied also to cases of using a plurality of more numbers of boards and the like.

That is, the present invention can be applied to a case where the transmission/reception rigid boards 12A, 12B on the electric connector 12C side are constituted with three or more boards, a case where there are three lines of optical inputs and outputs, a case where there are three or more optical modules, etc.

Further, in each of the exemplary embodiments described above, the printed board is constituted with the two boards such as the transmission rigid board 12A and the reception rigid board 12B, and each of the rigid boards 12A, 12B is connected, respectively, to the module mounting board 13 via each of the flexible boards 15A, 15B or the like. However, the present invention is not limited only to such case. Rigid flexible boards may be used instead of each of the rigid boards 12A, 12B and each of the flexible boards 15A, 15B, etc.

In that case, the rigid sections and the flexible sections are unified, so that signal deterioration and the like caused due to the junction parts between the rigid boards and the flexible boards can be prevented. This makes it possible to acquire an excellent property face.

Moreover, when the rigid flexible board in which the rigid section and the flexible section are unified is used, the flexible boards 15A and 15B become unnecessary. This makes it possible to reduce the number of members.

Further, in each of the exemplary embodiments described above, each of the transmission members, i.e., the transmission rigid board 12A, the transmission flexible boards 15A, 25A, 35A, the transmission flexible board 15A, the transmission optical module 14A, and the transmission optical fiber array 16A, is disposed on the upper side when the optical transceiver 10 is in a normal use state, while each of the reception members, i.e., the reception rigid board 12B and the like, is disposed on the lower side when the optical transceiver 10 is in a normal use state. However, the present invention is not limited only to such case. The transmission side and the reception side may be disposed inversely, i.e., each of the transmission members may be disposed in the lower side and each of the reception members may be disposed on the upper side. The whole or part of the exemplary embodiments disclosed above can be described as, but not limited to, the following Supplementary Notes.

(Supplementary Note 1)

An optical transceiver which includes: a casing; at least a pair of transmission and reception printed boards provided inside the casing in parallel to each other with a prescribed space provided therebetween, each having an electric connector section provided at one end, which is capable of being connected to the other board of each other; a pair of optical modules for the respective printed boards provided, respectively, to other end sides of the pair of printed boards inside the casing for mutually converting an electric signal and an optical signal; an optical connector provided on an optical output side in a region of the other ends of the pair of printed boards; and at least a pair of optical fiber arrays which connect the pair of optical modules and the optical connector, wherein the pair of optical modules are disposed between the optical connector and the pair of printed boards via a connecting member, and a length between module mounting faces of the connecting member where the pair of optical modules are mounted is set to be smaller than a length between the pair of printed boards.

(Supplementary Note 2)

The optical transceiver as depicted in Supplementary Note 1, wherein the optical module mounting faces are formed in parallel to the pair of printed boards.

(Supplementary Note 3)

The optical transceiver as depicted in Supplementary Note 1 or 2, wherein: the pair of printed boards are formed with an optical transmission rigid board and an optical reception rigid board; and the connecting member includes a module mounting board where the transmission optical module and the reception optical module are mounted, respectively, to its top and back faces, and a pair of optical transmission and optical reception flexible boards which connect the optical transmission rigid board and the optical reception rigid board to the module mounting board, respectively.

(Supplementary Note 4)

The optical transceiver as depicted in Supplementary Note 3, wherein widths of the optical transmission flexible board and the optical reception flexible board are set to be smaller than widths of the optical transmission rigid board and the optical reception rigid board, respectively.

(Supplementary Note 5)

The optical transceiver as depicted in Supplementary Note 1 or 2, wherein: the pair of printed boards are formed with an optical transmission rigid board and an optical reception rigid board; the connecting member is formed with a pair of transmission and reception flexible boards formed by being extended towards the optical connector side from the other ends of the optical transmission rigid board and the optical reception rigid board; and the other ends of the flexible boards are formed in parallel to the optical transmission rigid board and the optical reception rigid board, parallel faces thereof are used as the module mounting faces, and sections between the optical module mounting faces and the pair of printed boards are formed in a curved shape.

(Supplementary Note 6)

The optical transceiver as depicted in Supplementary Note 5, wherein: widths of the pair of flexible boards are formed to be smaller than widths of the optical transmission rigid board and the optical reception rigid board, and formed in a length corresponding to widths of each of the optical modules.

(Supplementary Note 7)

The optical transceiver as depicted in Supplementary Note 1, wherein: the plurality of printed boards are formed with an optical transmission rigid board and an optical reception rigid board, and ends of each of the rigid boards on the optical connector side are formed in such a manner that a center part thereof along a width direction has a flat-face shape with a recessed part recessed to the electric connector side; the connecting member includes an optical transmission flexible board and an optical reception flexible board disposed in the recessed parts, which are extended towards the optical connector side from the ends on the electric connector side of the optical transmission rigid board and the optical reception rigid board constituting the recessed parts, and the mounting faces thereof being formed in parallel to the optical transmission rigid board and the optical reception rigid board; and sections between parallel mounting faces of the pair of flexible boards and the optical transmission rigid board as well as the optical reception rigid board are formed in a curved shape.

(Supplementary Note 8)

The optical transceiver as depicted in Supplementary Note 7, wherein widths of the optical transmission flexible board and the optical reception flexible board are formed in a length corresponding to widths of the pair of optical modules.

INDUSTRIAL APPLICABILITY

The present invention can be utilized when housing a plurality of transmission/reception printed boards and transmission/reception optical modules inside a casing whose size is standardized.

What is claimed is:

1. An optical transceiver, comprising
a casing; at least a pair of transmission and reception printed boards provided inside the casing in parallel to each other with a prescribed space provided therebetween, each having an electric connector section provided at one end, which is capable of being connected to the other board of each other; a pair of optical modules for the respective printed boards provided, respectively, to other end sides of the pair of printed boards inside the casing for mutually converting an electric signal and an optical signal; an optical connector provided on an optical output side in a region of the other ends of the pair of printed boards; and at least a pair of optical fiber arrays which connect the pair of optical modules and the optical connector, wherein
the pair of optical modules are disposed between the optical connector and the pair of printed boards via a connecting member, and a length between module mounting faces of the connecting member where the pair of optical modules are mounted is set to be smaller than a length between the pair of printed boards.

2. The optical transceiver as claimed in claim 1, wherein the optical module mounting faces are formed in parallel to the pair of printed boards.

3. The optical transceiver as claimed in claim 2, wherein: the pair of printed boards are formed with an optical transmission rigid board and an optical reception rigid board; and
the connecting member comprises a module mounting board where the transmission optical module and the reception optical module are mounted, respectively, to its top and back faces, and a pair of optical transmission and optical reception flexible boards which connect the optical transmission rigid board and the optical reception rigid board to the module mounting board, respectively.

4. The optical transceiver as claimed in claim 3, wherein widths of the optical transmission flexible board and the optical reception flexible board are set to be smaller than widths of the optical transmission rigid board and the optical reception rigid board, respectively.

5. The optical transceiver as claimed in claim 2, wherein:
the pair of printed boards are formed with an optical transmission rigid board and an optical reception rigid board;
the connecting member is formed with a pair of transmission and reception flexible boards formed by being extended towards the optical connector side from the other ends of the optical transmission rigid board and the optical reception rigid board; and
the other ends of the flexible boards are formed in parallel to the optical transmission rigid board and the optical reception rigid board, parallel faces thereof are used as the module mounting faces, and sections between the optical module mounting faces and the pair of printed boards are formed in a curved shape.

6. The optical transceiver as claimed in claim 5, wherein: widths of the pair of flexible boards are formed to be smaller than widths of the optical transmission rigid board and the optical reception rigid board, and formed in a length corresponding to widths of each of the optical modules.

7. The optical transceiver as claimed in claim 1, wherein:
the plurality of printed boards are formed with an optical transmission rigid board and an optical reception rigid board, and ends of each of the rigid boards on the optical connector side are formed in such a manner that a center part thereof along a width direction has a flat-face shape with a recessed part recessed to the electric connector side;
the connecting member comprises an optical transmission flexible board and an optical reception flexible board disposed in the recessed parts, which are extended towards the optical connector side from the ends on the electric connector side of the optical transmission rigid board and the optical reception rigid board constituting the recessed parts, and the mounting faces thereof being formed in parallel to the optical transmission rigid board and the optical reception rigid board; and
sections between parallel mounting faces of the pair of flexible boards and the optical transmission rigid board as well as the optical reception rigid board are formed in a curved shape.

8. The optical transceiver as claimed in claim 7, wherein widths of the optical transmission flexible board and the optical reception flexible board are formed in a length corresponding to widths of the pair of optical modules.

9. An optical transceiver, comprising
a casing; at least a pair of transmission and reception printed boards provided inside the casing in parallel to each other with a prescribed space provided therebetween, each having an electric connector section provided at one end, which is capable of being connected to the other board of each other; a pair of optical means for the respective printed boards provided, respectively, to other end sides of the pair of printed boards inside the casing for mutually converting an electric signal and an optical signal; an optical connector provided on an optical output side in a region of the other ends of the pair of printed boards; and at least a pair of optical fiber arrays which connect the pair of optical means and the optical connector, wherein
the pair of optical means are disposed between the optical connector and the pair of printed boards via a connecting member, and a length between module mounting faces of the connecting member where the pair of optical means are mounted is set to be smaller than a length between the pair of printed boards.

* * * * *